United States Patent
Byrd (10) Patent No.: US 10,979,410 B1
(45) Date of Patent: Apr. 13, 2021

(54) SYSTEMS AND METHODS FOR UTILIZING CRYPTOLOGY WITH VIRTUAL LEDGERS IN SUPPORT OF TRANSACTIONS AND AGREEMENTS

(71) Applicant: United Services Automobile Association (USAA), San Antonio, TX (US)

(72) Inventor: Christopher Byrd, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 470 days.

(21) Appl. No.: 15/146,196

(22) Filed: May 4, 2016

Related U.S. Application Data (60) Provisional application No. 62/158,968, filed on May 8, 2015, provisional application No. 62/156,706, filed on May 4, 2015.

(51) Int. Cl.
*H04L 9/32* (2006.01)
*H04L 29/06* (2006.01)

(52) U.S. Cl.
CPC .......... *H04L 63/064* (2013.01); *H04L 63/061* (2013.01)

(58) Field of Classification Search
CPC ............................ H04L 63/064; H04L 63/061
See application file for complete search history.

(56) References Cited

U.S. PATENT DOCUMENTS

| | | | |
|---|---|---|---|
| 9,413,735 B1* | 8/2016 | Hird ..................... | H04L 63/08 |
| 9,569,771 B2 | 2/2017 | Lesavich et al. | |
| 9,722,790 B2 | 8/2017 | Ebrahimi | |
| 9,742,564 B2* | 8/2017 | Moffat ................. | H04L 9/0894 |
| 9,774,578 B1 | 9/2017 | Ateniese et al. | |
| 9,830,580 B2* | 11/2017 | MacGregor ........... | H04L 9/3236 |
| 2004/0030894 A1* | 2/2004 | Labrou .................. | G06Q 20/02 |
| | | | 713/168 |
| 2009/0132351 A1* | 5/2009 | Gibson .................. | G06Q 20/02 |
| | | | 705/12 |
| 2009/0210328 A1 | 8/2009 | Fomenko et al. | |
| 2014/0222885 A1* | 8/2014 | Mohan .................... | H04L 63/02 |
| | | | 709/201 |
| 2015/0278820 A1 | 10/2015 | Meadows | |
| 2015/0332395 A1 | 11/2015 | Walker et al. | |
| 2015/0356524 A1 | 12/2015 | Pennanen | |
| 2015/0356555 A1 | 12/2015 | Pennanen | |
| 2015/0371224 A1 | 12/2015 | Lingappa | |

(Continued)

FOREIGN PATENT DOCUMENTS

| | | |
|---|---|---|
| AU | 2016101183 A4 | 9/2016 |
| CN | 105488722 A | 4/2016 |

(Continued)

*Primary Examiner* — Shewaye Gelagay
*Assistant Examiner* — Carlton Johnson
(74) *Attorney, Agent, or Firm* — Fletcher Yoder, P.C.

(57) ABSTRACT

A computer-implemented method of encrypting information on a virtual ledger, the method including receiving the information from a first party and a second party, encrypting a portion of the information received from at least one of the first party and the second party, publishing the encrypted portion on the virtual ledger, and providing a decryption key based upon the published encrypted portion to the first party and the second party.

15 Claims, 4 Drawing Sheets

(56) References Cited

U.S. PATENT DOCUMENTS

| | | |
|---|---|---|
| 2015/0379510 A1 | 12/2015 | Smith |
| 2016/0203477 A1 | 7/2016 | Yang et al. |
| 2016/0210626 A1 | 7/2016 | Ortiz et al. |
| 2016/0261411 A1 | 9/2016 | Yau et al. |
| 2016/0321751 A1 | 11/2016 | Creighton, IV et al. |
| 2016/0330027 A1 | 11/2016 | Ebrahimi |
| 2016/0358165 A1 | 12/2016 | Maxwell |
| 2016/0365978 A1 | 12/2016 | Ganesan et al. |
| 2016/0371771 A1 | 12/2016 | Serrano et al. |
| 2017/0011460 A1 | 1/2017 | Molinari et al. |
| 2017/0046664 A1 | 2/2017 | Haldenby et al. |
| 2017/0046799 A1 | 2/2017 | Chan et al. |
| 2017/0053249 A1 | 2/2017 | Tunnell et al. |
| 2017/0076280 A1 | 3/2017 | Castinado et al. |
| 2017/0076286 A1 | 3/2017 | Castinado et al. |
| 2017/0076306 A1 | 3/2017 | Snider et al. |
| 2017/0078299 A1 | 3/2017 | Castinado et al. |
| 2017/0103391 A1 | 4/2017 | Wilson, Jr. et al. |
| 2017/0109748 A1 | 4/2017 | Kote |
| 2017/0116693 A1 | 4/2017 | Rae et al. |
| 2017/0134161 A1 | 5/2017 | Goeringer et al. |
| 2017/0140375 A1 | 5/2017 | Kunstel |
| 2017/0154331 A1 | 6/2017 | Voorhees |
| 2017/0177898 A1 | 6/2017 | Dillenberger |
| 2017/0193619 A1 | 7/2017 | Rollins et al. |
| 2017/0206382 A1 | 7/2017 | Rodriguez De Castro et al. |
| 2017/0206532 A1 | 7/2017 | Choi |
| 2017/0214699 A1 | 7/2017 | Johnsrud |
| 2017/0221029 A1 | 8/2017 | Lund et al. |
| 2017/0228371 A1 | 8/2017 | Seger, II |
| 2017/0228704 A1 | 8/2017 | Zhou et al. |
| 2017/0228734 A1 | 8/2017 | Kurian |
| 2017/0230375 A1 | 8/2017 | Kurian |
| 2017/0232300 A1 | 8/2017 | Tran et al. |
| 2017/0236123 A1 | 8/2017 | Ali et al. |
| 2017/0237554 A1 | 8/2017 | Jacobs et al. |
| 2017/0243208 A1 | 8/2017 | Kurian et al. |
| 2017/0244707 A1 | 8/2017 | Johnsrud et al. |
| 2017/0250972 A1 | 8/2017 | Ronda et al. |
| 2017/0270527 A1 | 9/2017 | Rampton |
| 2017/0278186 A1 | 9/2017 | Creighton, IV et al. |
| 2017/0279783 A1 | 9/2017 | Milazzo et al. |
| 2017/0279801 A1 | 9/2017 | Andrade |
| 2017/0286717 A1 | 10/2017 | Khi et al. |
| 2017/0287068 A1 | 10/2017 | Nugent |
| 2017/0289111 A1 | 10/2017 | Voell et al. |

FOREIGN PATENT DOCUMENTS

| | | |
|---|---|---|
| CN | 105681301 A | 6/2016 |
| CN | 105956923 A | 9/2016 |
| CN | 105976231 A | 9/2016 |
| CN | 106097101 A | 11/2016 |
| CN | 106228446 A | 12/2016 |
| CN | 106230808 A | 12/2016 |
| CN | 106230852 A | 12/2016 |
| CN | 106339875 A | 1/2017 |
| CN | 106355488 A | 1/2017 |
| CN | 106408299 A | 2/2017 |
| CN | 106452785 A | 2/2017 |
| CN | 106453415 A | 2/2017 |
| CN | 106484836 A | 3/2017 |
| CN | 106485167 A | 3/2017 |
| CN | 106504091 A | 3/2017 |
| CN | 106530083 A | 3/2017 |
| CN | 106530088 A | 3/2017 |
| CN | 106600403 A | 4/2017 |
| CN | 106790431 A | 5/2017 |
| KR | 101590076 B1 | 2/2016 |
| KR | 101591244 B1 | 2/2016 |
| KR | 20160150278 A | 12/2016 |
| KR | 101762245 B1 | 7/2017 |
| KR | 101773074 B1 | 8/2017 |
| KR | 1101773073 B1 | 8/2017 |
| KR | 101780636 B1 | 9/2017 |
| WO | 2015085393 A1 | 6/2015 |
| WO | 2016036969 A1 | 3/2016 |
| WO | 2016154001 A1 | 9/2016 |
| WO | 2016201429 A1 | 12/2016 |
| WO | 2017006134 A1 | 1/2017 |
| WO | 2017006135 A1 | 1/2017 |
| WO | 2017006136 A1 | 1/2017 |
| WO | 2017021154 A1 | 2/2017 |
| WO | 2017027648 A1 | 2/2017 |
| WO | 2017044554 A1 | 3/2017 |
| WO | 2017065389 A1 | 4/2017 |
| WO | 2017066715 A1 | 4/2017 |
| WO | 2017079795 A1 | 5/2017 |
| WO | 2017091530 A1 | 6/2017 |
| WO | 2017095036 A1 | 6/2017 |
| WO | 2017104899 A1 | 6/2017 |
| WO | 2017109140 A1 | 6/2017 |
| WO | 2017119564 A1 | 7/2017 |
| WO | 2017136643 A1 | 8/2017 |
| WO | 2017136956 A1 | 8/2017 |
| WO | 2017139688 A1 | 8/2017 |
| WO | 2017143435 A1 | 8/2017 |
| WO | 2017146333 A1 | 8/2017 |

* cited by examiner

SYSTEMS AND METHODS FOR UTILIZING CRYPTOLOGY WITH VIRTUAL LEDGERS IN SUPPORT OF TRANSACTIONS AND AGREEMENTS

RELATED APPLICATION(S)

This application claims priority to App. No. 62/156,706, filed May 4, 2015, titled "SYSTEMS AND METHODS FOR UTILIZING VIRTUAL LEDGERS IN SUPPORT OF TRANSACTIONS AND AGREEMENTS," and to App. No. 62/158,968, filed May 8, 2015, titled "SYSTEMS AND METHODS FOR UTILIZING VIRTUAL LEDGERS IN SUPPORT OF TRANSACTIONS AND AGREEMENTS" the entirety of which are incorporated herein by reference.

BACKGROUND

Cryptocurrencies, such as Bitcoin, are increasing in popularity. An ever-growing number of businesses and individuals are using cryptocurrencies to store value and as a medium of exchange. It is now possible to pay individuals and purchase goods and services using cryptocurrencies. As a result, the number of daily transactions using cryptocurrencies is increasing.

For many cryptocurrency systems to work it is important that there be a ledger system that maintains the integrity of the system. In most such cryptocurrency systems, a virtual ledger system may be maintained by a group of decentralized individuals who validate and timestamp transactions and add them to the virtual ledger. In one example, that of Bitcoin, this virtual ledger system is referred to as a blockchain and the individuals who maintain the blockchain are referred to as miners. These miners serve to encode data regarding Bitcoin transactions into the blockchain.

The blockchain allows for recording of information, including information associated with multiple parties who wish to protect at least some of the information. Cryptology can provide methods for protecting information, but known methods do not provide the use of cryptology to protect information on a blockchain. As such, methods and systems for utilizing cryptology with virtual ledgers are needed.

BRIEF DESCRIPTION OF THE DRAWINGS

So that those having ordinary skill in the art, to which the present disclosure pertains, will more readily understand how to employ the novel system and methods of the present disclosure, certain illustrated embodiments thereof will be described in detail herein-below with reference to the drawings, wherein.

A component or a feature that is common to more than one drawing is indicated with the same reference number in each of the drawings.

SUMMARY

In one aspect of the disclosure, a computer-implemented method of encrypting information on a virtual ledger includes receiving the information from a first party and a second party, encrypting a portion of the information received from at least one of the first party and the second party, publishing the encrypted portion on the virtual ledger, and providing a decryption key based upon the published encrypted portion to the first party and the second party.

In one aspect of the disclosure, a computer-implemented method of decrypting information on a virtual ledger includes receiving, via a graphical user interface, a request from at least one of a first party and a second party to access information on the virtual ledger, at least a portion of the information being encrypted, requesting the information from the virtual ledger, receiving the information from the virtual ledger, decrypting the encrypted portion of the information, and providing the information after the decrypting step to at least one of the first party and the second party.

In another aspect of the disclosure, a computer-implemented system of encrypting information on a virtual ledger includes a non-transitory memory to store instructions, a display including a graphical user interface to receive information, a processor operably coupled to the memory and display and to execute the instructions including providing the graphical user interface to one or more parties to receive the information, receiving, via the graphical user interface, the information from the one or more parties, encrypting a portion of the information, and publishing the information, including the encrypted portion and an unencrypted portion, on the ledger.

DETAILED DESCRIPTION OF CERTAIN EMBODIMENTS

The present disclosure is directed to systems and methods for utilizing virtual ledgers. It is to be appreciated the subject disclosure is described below more fully with reference to the accompanying drawings, in which illustrated embodiments of the present disclosure are shown. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the aspects of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

One skilled in the art will appreciate further features and advantages of the disclosure based on the above-described aspects. Accordingly, the disclosure is not to be limited by what has been particularly shown and described, except as indicated by any appended claims. Further, although at least one series of steps are presented as an exemplary method of practicing one or more aspects described herein, it will be appreciated by those skilled in the art that the steps identified may be practiced in any order that is practicable, including without limitation the omission of one or more steps.

Figure 1:
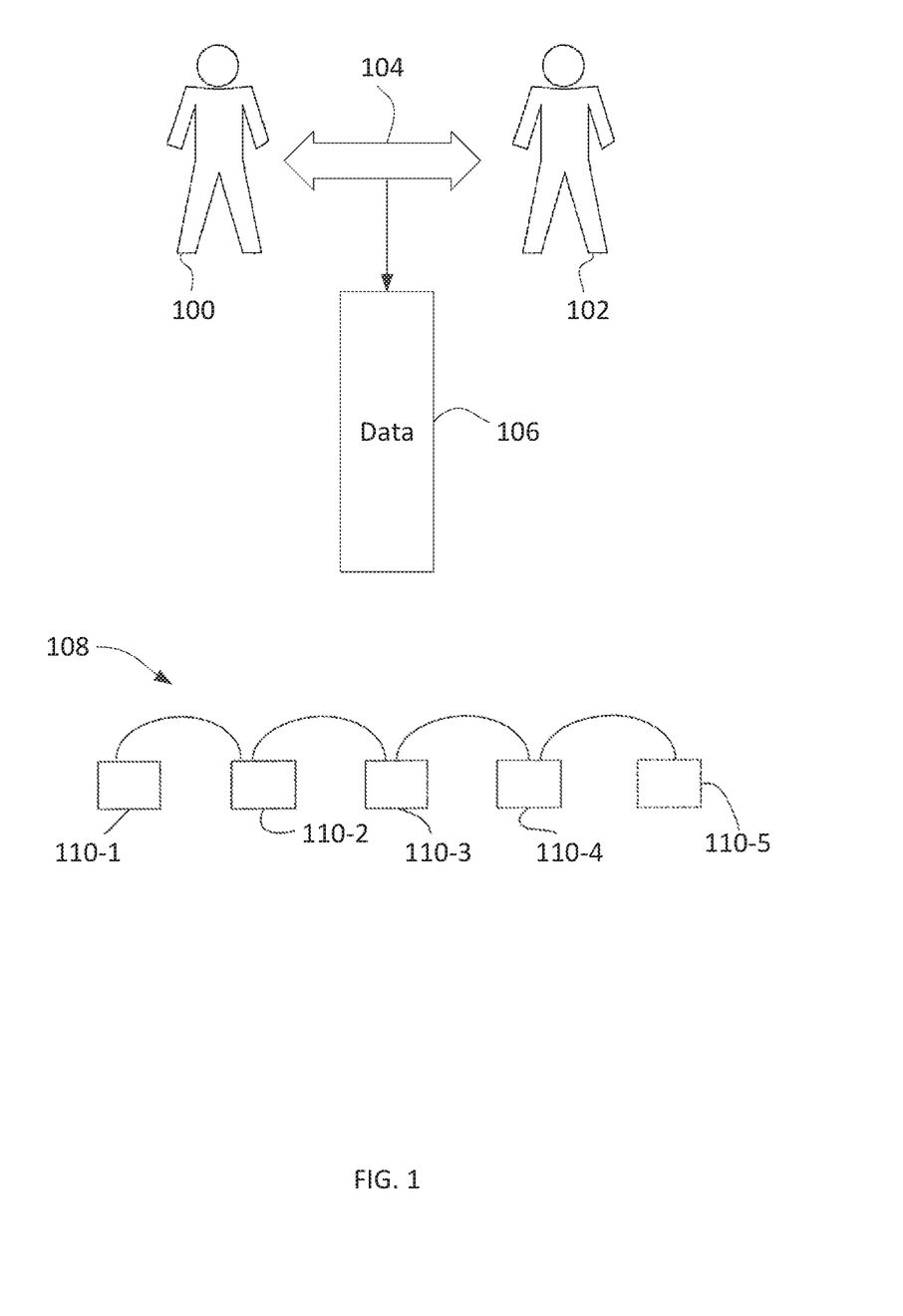
FIG. 1 depicts an exemplary transaction between two individuals or entities and an exemplary virtual ledger that may be used to record the transaction described in FIG. 1.

Referring to FIG. 1, two entities 100 and 102 are shown. In one example, entities 100 and 102 may be individuals. In another example, entities 100 and 102 may be business organizations, such as corporations, banks, insurance companies, or some variation thereof. Entities 100 and 102 may be any combination of entities. In addition, more than two entities may be involved, including any combination of individuals, organizations, and the like. Entities 100 and 102 may conduct a transaction 104. The transaction 104 may comprise an exchange of goods, property, or currency. In another example, the transaction 104 may comprise an exchange of promises, such as an agreement or contract. In another example, the transaction 104 may include a legal agreement that is self-executing, such as a smart contract.

Referring further to FIG. 1, in one example, the transaction 104 may include information 106. The information 106 may have information about the parties, the terms of a contract or agreement, and the like. For example, the information 106 may have the identities of entities 100, 102 and the details of the transaction 104, which may be a contract, agreement, or the like. Such details may include, but are not limited to: the goods, services, and/or property being exchanged; the purchase price of the goods, services, and/or property; contractual terms and conditions binding the entities 100 and 102; warranties covering the transaction; certain remedies or compensation that may cover certain breaches of the agreement underlying the transaction 104.

Referring further to FIG. 1, the entities 100, 102 in one example may elect to store the information 106 in a virtual ledger 108 such as a blockchain. The entities may use a blockchain of the type used to record Bitcoin and other types of transactions and agreements. The recording of information in the ledger could also be for hyperlinks, legal documents, ledgers, identities, regulatory documents, property interests, and the like. The virtual ledger 108 in one example comprises a plurality of encoded blocks 110 that represent the data related to transactions that have previously occurred. In the example shown in FIG. 1, block 110-1 occurred before block 110-2, and block 110-2 occurred before block 110-3, etc. Each block 110 is encoded or hashed such that it incorporates the data in blocks that came before it. Accordingly, the information 106 may be hashed into block 110-5 that may incorporate the transaction data from block 110-4.

Figure 2:
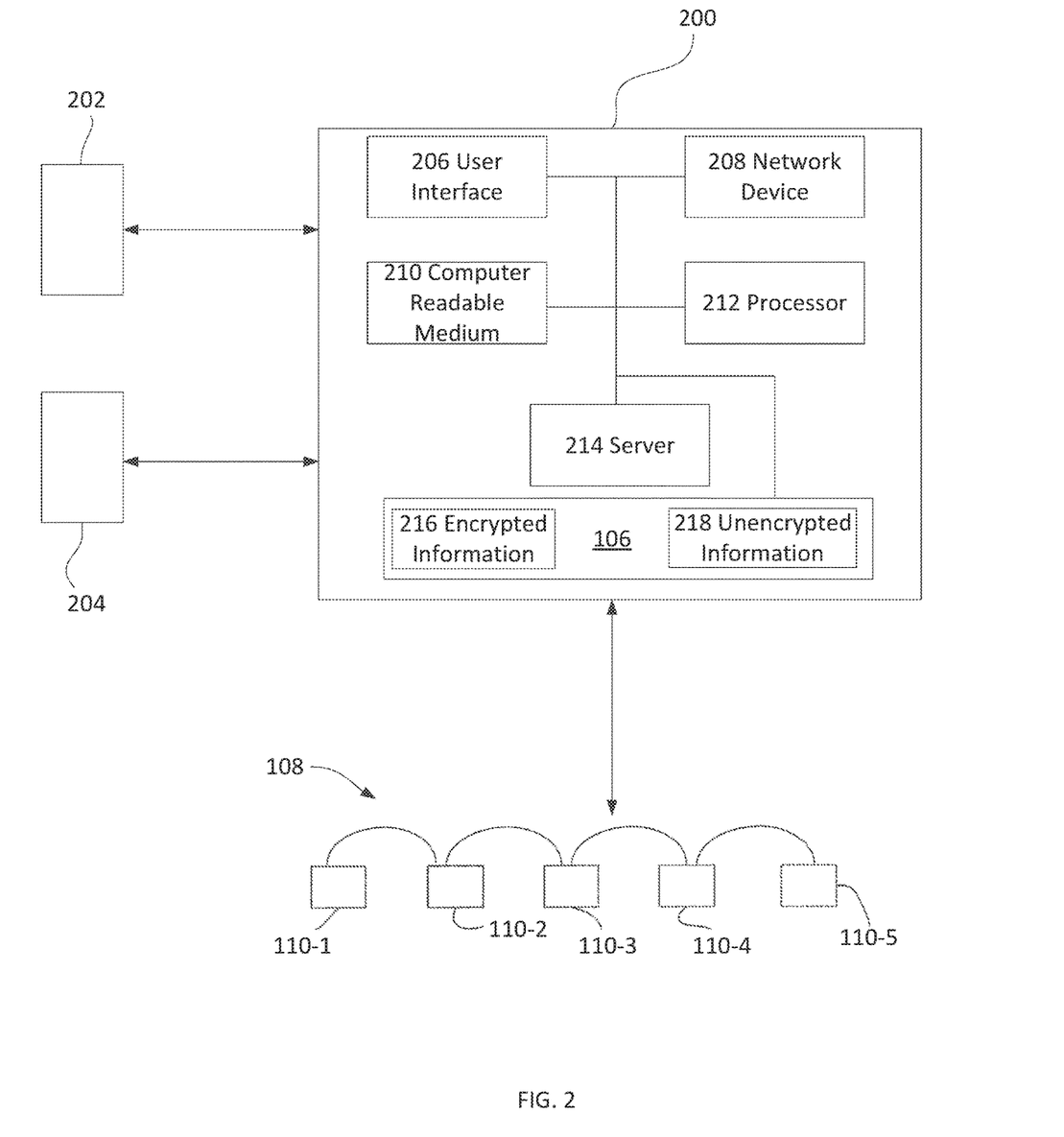
FIG. 2 depicts a system for receiving, encrypting, decrypting, and transmitting information for use in the blockchain according to aspects of the present disclosure.

FIG. 2 depicts a system for receiving, encrypting, decrypting, and transmitting information 106 for use in the ledger 108. A platform 200 may receive information 106 from user devices 202 and 204, and may receive information 106 from any number of additional user devices. The user devices 202 and 204 may be computers, cellular phones, tablets, or the like. The platform 200 may include a user interface 206 to receive information 106 from the user devices 202, 204 and/or the blockchain or other sources. The user interface 206 may be a graphical user interface provided to the user devices via a web platform, an application, or the like. The user interface 206 may receive inputs such as information 106 about the users, transactional information, contract information, requests for information, and the like. The platform 200 may also include a network device 208 to provide platform access to the user devices via a network.

User devices may be networked via a local area network (LAN), a wide area network (WAN), a personal area network (PAN), and/or combinations thereof. Such networking environments are commonplace in offices, enterprise-wide computer networks, intranets, and the Internet. It is to be appreciated that the network connections described and identified above are exemplary and other means of establishing a communications link between multiple devices may be used.

The platform 200 may also have a computer readable medium 210. The computer readable medium 210 may be configured to store, for example, instructions, encryption data, decryption data, and the like. For the purposes of this disclosure, the computer readable medium 210 may store computer data, which may include computer program code that may be executable by a processor 212 of the platform 200 in machine readable form. By way of example, and not limitation, the computer readable medium 210 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information 106 such as computer-readable instructions, data structures, program modules, or other data. In one or more aspects, the actions and/or events of a method, algorithm, or module may reside as one or any combination or set of codes and/or instructions on a computer readable medium 210 or machine readable medium, which may be incorporated into a computer program product.

The platform 200 may also have one or more processors 212. The processor 212 can be, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute instructions and to facilitate the transmission of data.

In another aspect, the platform 200 may have one or more servers 214. The server 214 may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server 214 may include peripheral devices that may allow information 106 to be retrieved from an external source, and the result of operations saved and retrieved. The server 214 may operate within a client-server architecture. The server 214 may perform some tasks on behalf of clients. The clients may connect to the server 214 through the network on a communication channel. The server 214 may use memory with error detection and correction, redundant disks, redundant power supplies and so on.

The parties storing on and requesting information 106 from the blockchain may want to protect at least some of the information 106. Because blockchain may be a public ledger, some form of cryptology may be used to maintain privacy and control over some or all of the information 106 in the blockchain. For example, to protect the information 106 for use in the blockchain, at least some of the information 106 may be encrypted as explained herein.

The platform 200 may receive information 106 from two or more parties using user devices 202 and 204, for example, and any additional number of user devices. The information 106 may include contract information related to the parties, the terms of their agreement, and the like. The parties may request that all or some of the information 106 be protected. The information 106 to be protected may be specified by the parties, or may be automatically determined by the platform 200. For example, the parties may wish to protect access to all or some terms of their contract stored in the blockchain. In another aspect, the platform 200 may be programmed to determine which types of information 106 related to the contract should be protected. For example, the platform 200 may be programmed to allow for some general information such as the parties and type of contract to be unencrypted and therefore publicly accessible from the blockchain, and to recognize that specific terms and conditions are to be encrypted.

Any information 106 received by the platform 200 which does not need to be encrypted may be published as unencrypted information 218 on the blockchain. Unencrypted information 106 on the blockchain may be publicly accessible. Any information 106 to be encrypted may be encrypted in one or more ways including advanced encryption standard, RSA, triple data encryption standard, hashing, symmetric key decryption, public key decryption, and the like. All encrypted information 216 may be encrypted completely by the same encryption method, or different portions of the encrypted information 216 may be encrypted with multiple encryption methods. Encryption methods employed by the platform 200 may also be updated manually or periodically.

Encryption can include link encryption, end-to-end encryption, and the like. Link encryption, for example, may encrypt and decrypt the information 106 as the information 106 is transmitted between network locations. In one aspect, as the information 106 is transmitted from a server, the information 106 may be encrypted upon leaving the server, decrypted at another server or link, and encrypted again upon leaving the server or link until the information 106 reaches an end destination such as the user devices 202 and 204. Information 106 requested by the user devices 202 and 204 from the blockchain may be encrypted upon leaving the blockchain, decrypted upon receipt by the platform 200, and provided to the user devices 202 and 204. Alternatively, the platform 200 may re-encrypt the information 106 received from the blockchain for decryption by the user devices 202 and 204. For example, the platform 200 may re-encrypt the entire portion of information 106 with the same or a different method of encryption before providing the information to the user devices 202 and 204. A different method of encryption may be used based on the capabilities and resources of the user devices 202 and 204, the sensitivity of the information 106, user requests, and the like. Alternatively, the platform 200 may determine that only a portion of the information 106 should be encrypted and/or provided to the user devices 202 and 204.

Encryption can also be end-to-end, meaning only the sender and receiver of the information 106 may be able to decrypt the information 106 being transmitted. In such an aspect, encryption and decryption keys may be used by the communicating parties such as the user devices 202 and 204, and the platform 200. In an aspect, encryption and decryption keys may be used by the blockchain and the platform 200 so that when the platform 200 receives a request for information 106 from the blockchain, the transmission of the information 106 between the blockchain and the platform 200 is protected so that no one without a decryption key can access the information 106 from the blockchain. In such an aspect, the platform 200 may decrypt the information 106 before sending it to the user devices 202 and 204, or may re-encrypt the information 106 for decryption by the user devices 202 and 204.

To allow for protection and control of encrypted information 216, the platform 200 may provide decryption keys. A decryption key may decrypt some or all of the decrypted information, and may be provided to one or more parties and/or the platform 200 to decrypt the information 106. A decryption key may also have multiple portions split between users so that each user may only obtain certain portions of the encrypted information 216 from the blockchain.

In one aspect, the platform 200 may provide each user with one or more decryption keys corresponding to one or more encrypted portions of the information 106 stored in the blockchain. A decryption key can be a symmetric key, meaning the same key is used for both encryption and decryption. Decryption keys can also be asymmetric from encryption keys. A decryption key may determine based on a cryptology algorithm the information 106 to be output.

When a user requests information 106 from the blockchain, the platform 200 may provide any unencrypted information 218 to which the user is allowed to access. The platform 200 may evaluate whether a requesting user has a decryption key and whether the decryption key is valid for particular information 106 requested by a user, or may alternatively provide the encrypted information 21 106 to the user for a decryption key to decrypt. In another aspect, the platform 200 may decrypt the encrypted information 216 and provide it to the proper user based on the user request and a corresponding decryption key for the user to access the information 106. The platform 200 may recognize that the requesting user has a valid decryption key for the requested information 106, and may facilitate decryption upon that determination.

In another aspect, multiple parties of a contract may wish to allow some of their information 106 to be unencrypted, such as the type of contract, the names of the parties, terms, timing, and the like. If the users wish to encrypt other portions of the information, the information 106 may be encrypted accordingly. In one such aspect, all encrypted information 216 may be accessed by each user who is a party to the agreement. In this aspect, one decryption or more decryption keys may be provided by the platform 200 to the contracting parties to access all of the encrypted information 216 upon request. Also, in this aspect, each party may, independent from the other party, provide the decryption key to other parties to access encrypted information 216 from the blockchain.

For example, a contracting party may want to allow other business partners and subcontracting parties to see at least some portion of the information 106 in the blockchain. The contracting party may provide a decryption key to such parties. Alternatively, the platform 200 may issue additional decryption keys to such parties upon request. The platform 200 may also maintain a record or which parties have the ability to access encrypted information 216 so that the platform 200 may issue those parties decryption keys and/or may perform decryption of encrypted information 216 based on whether a requesting party has been authorized to receive decrypted information 106.

In another aspect, each party may receive from the platform 200 one or more decryption keys or portions of decryption keys corresponding to different portions of encrypted data in the blockchain. As such, a party requesting encrypted information 216 may only be able to access the portions of encrypted data corresponding to their decryption keys. The platform 200 can perform this determination to restrict access to requesting parties based on whether or not they have proper decryption keys corresponding to encrypted information 216 requested. Alternatively, requested encrypted information 216 may be transmitted to a user who may only be able to view the information that the user's decryption key can decrypt.

Figure 3:
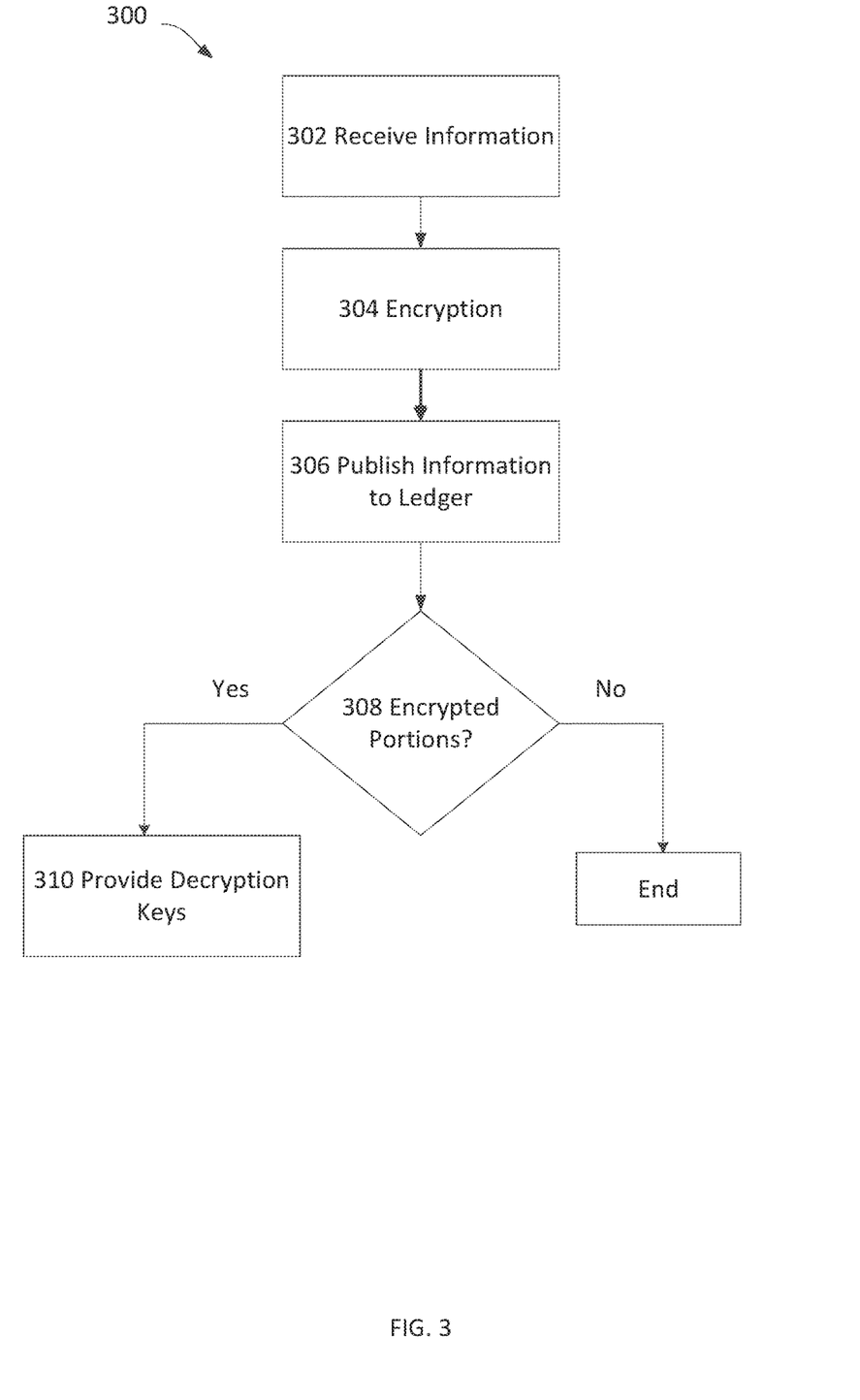
FIG. 3 shows a method of encrypting information for a ledger according to aspects of the present disclosure.

FIG. 3 depicts a method 300 for encrypting information 106 on the blockchain with the platform 200. In step 302, the platform 200 may receive information 106 from two or more parties. The information 106 may be provided to the platform 200 by one or more user devices. At step 304, the platform 304 may facilitate encryption of at least one portion of the information 106 received from the parties. The encryption may include encryption of one portion or multiple portions of information 106, requested by a user or automatically determined by the platform 200. At step 306, the platform 200 may publish the encrypted and unencrypted information 218 on the blockchain. To protect the encrypted information 216, the platform 200 may provide one or more decryption keys to the parties. At step 308, the platform 200 may determine how many portions of the information 106 have been encrypted, how many decryption keys are needed for which parties, and the like. If no information 106 has been encrypted, the process may end. If information 106 has been encrypted, the platform 200 may provide and document any decryption keys to any authorized parties at step 310.

Each encrypted portion of the information 106 may correspond to one decryption key or separate decryption keys. The same decryption key may be provided by the platform 200 to each party, or the platform 200 may provide each party different decryption keys or different portions of the same decryption keys corresponding to different encrypted information 216 stored on the blockchain.

Figure 4:
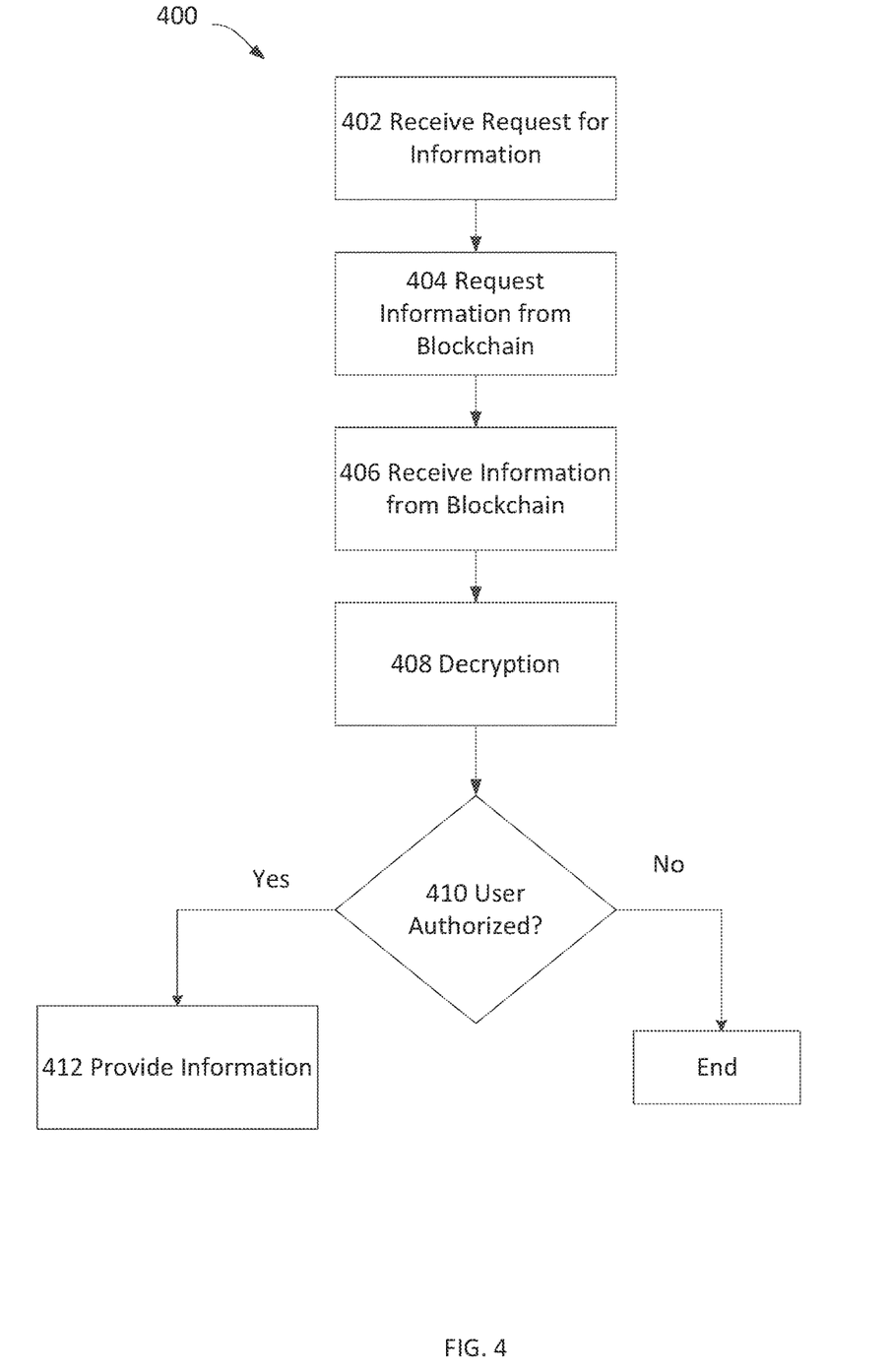
FIG. 4 shows a method of decrypting information for a ledger according to aspects of the present disclosure.

FIG. 4 depicts a method 400 for decrypting information 106 on the blockchain with the platform 200. In step 402, the platform 200 may receive a request from one or more parties to access information 106 stored on the blockchain. The platform 200 may verify whether the requesting parties have valid decryption keys and/or whether the parties are authorized to receive information 106 from the blockchain that has been decrypted. At step 404, the platform 200 may request the information 106 from the blockchain. At step 406, the platform 200 may receive the requested information 106 from the blockchain.

Once the information 106 has been received at step 406, the platform 200 may receive the requested information 106 from the blockchain. At least some portion of the information 106 may be encrypted as it leaves the blockchain. At step 408, the platform may decrypt any encrypted portion of requested information 106 at step 408. Decryption at step 408 may include using one or more decryption keys stored on the platform 200 or provided by the requesting user.

To access the encrypted information 216, the user must have access to a decryption key corresponding to the encrypted data. For example, a user may have access to all of the encrypted information 216, so the platform 200 may determine that any decryption keys or portions of decryption keys the user has may be valid and used to decrypt the encrypted information 216. In another example, a user may only have access to one or more portions of the encrypted information 216. The platform 200 may decrypt the encrypted portions of the information 106 corresponding to the user's decryption keys. Decryption can be performed by advanced encryption standard, RSA, triple data encryption standard, hashing, symmetric key decryption, public key decryption, and the like.

Once encrypted information 216 has been decrypted, the platform may determine whether to provide the information 106 to the requesting information 106 by determining the user's authorization at step 410. The determination may include verifying that the requesting user has a valid decryption key for any encrypted information 216. The platform 200 may also determine whether to re-encrypt any portion of the information 106 before providing it to the requesting user.

Once the platform 200 has determined which information 106 to provide to the requesting user, the platform 200 may provide all decrypted and unencrypted information 218 to a requesting user at step 412. Alternatively, the platform 200 may re-encrypt the information 106 before providing the information 106 to the requesting user. If all requesting users have a decryption key for all of the requested encrypted information 216, the platform 200 may provide all of the requested data to the users. If, however, each user only has access to some of the requested information 106 that is encrypted, the platform may decrypt and provide only the information 106 corresponding the each user's decryption keys.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The aspects in the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A computer-implemented method of encrypting an agreement on a virtual ledger, the method comprising:
   receiving, in a computer, a first portion of an information from a first party via user interface of the computer or via a first user device, wherein the first portion of the information is associated with the agreement;
   receiving, in the computer, a second portion of the information from a second party via the user interface of the computer or via a second user device, wherein the second portion of the information is associated with the agreement;
   receiving, in the computer, a request for encryption of the first portion from the first party via the user interface or the first user device;
   encrypting, in the computer, only the first portion of the information in response to receiving the request for encryption of the first portion to produce an encrypted portion of the agreement, wherein the encrypted portion is configured to be decrypted using a decryption key;
   generating, in a processor of the computer, the agreement by combining the encrypted portion and an unencrypted portion, wherein the encrypted portion comprises only the first portion of the information received from the first party and the unencrypted portion comprises the second portion of the information received from the second party, and wherein the agreement is based only on the first portion and the second portion;
   publishing the agreement on the virtual ledger to a server using a network device of the computer;
   providing the decryption key based upon the published agreement only to the first party via the user interface or the first user device;
   wherein the decryption key having multiple portions split between different parties such that each party only accesses certain portions of the encrypted information from the virtual ledger;
   wherein each party receives from the processor of the computer one or more decryption keys or portions of the one or more decryption keys corresponding to different portions of encrypted information in the virtual ledger, and each party requesting encrypted information is only able to access the portions of encrypted information corresponding to its decryption keys; and
   in response to determining that each party only has access to some of the requested encrypted information, decrypting and providing only the encrypted information corresponding to each party's decryption keys based on the published agreement.

2. The method of claim 1, wherein the requesting party comprises the first party and the second party, the decryption key includes a first decryption key for the first party and a second decryption key for the second party and providing the decryption key to the requesting party comprises providing the first decryption key to the first party and the second decryption key to the second party.

3. The method of claim 1, comprising:
   receiving an authorization request for a third party to access the agreement, via the user interface or the first user device; and
   providing the decryption key to the third party based upon the authorization request.

4. The method of claim 1, wherein the encrypted portion of the agreement includes names of parties to a contract associated with the agreement and terms of the contract.

5. The method of claim 4, wherein:
   the unencrypted portion includes at least one of the names of the parties or at least one term of the contract, and
   the encrypted portion includes at least one of the names of the parties or at least one term of the contract.

6. The method of claim 5, further comprising:
   publishing an aspect of the contract on the virtual ledger.

7. The method of claim 1, wherein the agreement further includes Bitcoin information.

8. The method of claim 1, wherein the user interface of the computer comprises a graphical user interface, the network device, a computer readable medium, or any combination thereof.

9. The method of claim 1, further comprising receiving, in the computer, only the second portion of the information from the second party via the user interface of the computer or via the second user device.

10. A computer-implemented method of decrypting information on a virtual ledger, the method comprising:
    receiving, via a graphical user interface of a computer, a request from a first party to access an agreement on the virtual ledger, wherein the agreement comprises an encrypted portion that comprises a first dataset received from a first party and a first unencrypted portion that comprises a second dataset received from a second party and wherein the request comprises a decryption key associated with the encrypted portion, and wherein the first dataset is encrypted in response to receiving a second request from the first party;
    requesting, via a network device, the agreement from the virtual ledger; receiving, via the network device, the agreement from the virtual ledger; determining, in a processor of the computer, that the first party is authorized to access the encrypted portion based on the decryption key;
    decrypting, in the processor, the encrypted portion of the agreement to obtain a second unencrypted portion using the decryption key;
    providing, via the graphical user interface, an unencrypted agreement that comprises the first unencrypted portion and the second unencrypted portion to the first party;
    wherein the decryption key having multiple portions split between different parties such that each party only accesses certain portions of the encrypted information from the virtual ledger;
    wherein each party receives from the processor of the computer one or more decryption keys or portions of the one or more decryption keys corresponding to different portions of encrypted information in the virtual ledger, and each party requesting encrypted information is only able to access the portions of encrypted information corresponding to its decryption keys; and
    in response to determining that each party only has access to some of the requested encrypted information, decrypting and providing only the information corresponding to each party's decryption keys based on the agreement.

11. The method of claim 10, wherein the encrypted portion includes a first part and a second part.

12. The method of claim 11, wherein the first part is associated with a first decryption key and the second part is associated with a second decryption key, and wherein the first decryption key is different from the second decryption key.

13. The method of claim 12, further comprising: determining that a third party has been authorized to receive at least one of the first part and the second part.

14. A computer-implemented system of encrypting information on a virtual ledger, the system comprising:
    a non-transitory memory configured to store instructions;
    a display including a graphical user interface configured to receive information associated with an agreement;
    a processor operably coupled to the non-transitory memory and display and configured to execute the instructions, wherein the instructions are configured to cause the processor to:
    receive, via the graphical user interface, a first portion of the information from a first party;
    receive, via the graphical user interface, a second portion of the information from a second party;
    receive, via the graphical user interface, a request to encrypt the first portion of the information from the first party;
    encrypt, in the processor, the first portion of the information to form an encrypted portion of the information;
    provide, via the graphical user interface, a decryption key associated with the encrypted portion of the information only to the first party;
    generate the agreement comprising the encrypted portion of the information and an unencrypted portion, wherein the encrypted portion comprises only the first portion of the information and the unencrypted portion comprises the second portion of the information;
    publishing, via a network device, the agreement on the virtual ledger;
    wherein the decryption key having multiple portions split between different parties such that each party only accesses certain portions of the encrypted information from the virtual ledger;
    wherein each party receives from the processor one or more decryption keys or portions of the one or more decryption keys corresponding to different portions of encrypted information in the virtual ledger, and each party requesting encrypted information is only able to access the portions of encrypted information corresponding to its decryption keys; and
    wherein the instructions are configured to cause the processor to in response to determining that each party only has access to some of the requested encrypted information, decrypting and providing only the information corresponding to each party's decryption keys based on the published agreement.

15. The system of claim 14, wherein the instructions are configured to cause the processor to:
    determine that the first party is authorized to receive the encrypted portion of the information;
    determine that the second party is authorized to receive the encrypted portion of the information; and
    provide the encrypted portion to the first party and to the second party.

\* \* \* \* \*